United States Patent Office 3,250,749
Patented May 10, 1966

3,250,749
BLENDED CHLORINATED AROMATIC POLYISO-
CYANATES USEFUL FOR POLYURETHANE
PREPARATION
Clifford A. Erickson, Mercer County, and Daniel Warren, East Brunswick, N.J., assignors to FMC Corporation, New York, N.Y., a corporation of Delaware
No Drawing. Filed June 13, 1962, Ser. No. 202,100
5 Claims. (Cl. 260—77.5)

This invention relates to chlorinated aromatic polyisocyanates, and more particularly, to aromatic polyisocyanates which contain at least about 25% chlorine and are capable of existing as liquids at 25° C.

Aromatic polyisocyanates have found considerable use in recent years as intermediates in the preparation of rigid and flexible foams, coatings and abrasion-resistant rubber substitutes. These products are prepared by condensing a high molecular weight polyol with an aromatic polyisocyanate thereby forming a polyurethane composition. These compositions may be prepared by the "one-shot" method in which the polyisocyanate is reacted directly with a stoichiometric amount of polyol, or by the "quasi-prepolymer" method in which the polyisocyanate is reacted with considerably less than a stoichiometric amount of polyol to form a quasi-prepolymer which can then be reacted with additional polyol to form the polyurethane composition. In both cases the polyurethane reaction generally takes place at about room temperature. When using the "one-shot" method, it is desirable that the polyisocyanate be liquid at room temperature so that the components can be thoroughly blended before the reaction commences. When the "quasi-prepolymer" method is employed, the quasi-prepolymer should be liquid at room temperature for the same reason.

There has been much interest in recent years in the preparation of flame-retardant polyurethane compositions. It has been suggested, for example, that polyurethane compositions having improved flame-retardance can be prepared from chlorinated aromatic polyisocyanates. However, this suggestion has achieved no commercial success, essentially due to the fact that chlorinated aromatic polyisocyanates are solid at room temperature. Accordingly, there is a real need for a highly chlorinated aromatic polyisocyanate which is liquid at room temperature.

It is an object of this invention to provide aromatic polyisocyanates which contain at least about 25% chlorine and are capable of existing as liquids at about 25° C.

Another object is to provide polyurethane quasi-prepolymers which are liquid at about 25° C. and are derived from aromatic polyisocyanates having chlorine contents of at least about 25%.

A further object is to provide flame-retardant polyurethane compositions which are derived from aromatic polyisocyanates having chlorine contents of at least about 25%.

These and other objects will become apparent from the following description of this invention.

We have now discovered certain aromatic polyisocyanate blends which contain about 25–42% chlorine, by weight, and are capable of existing as liquids at about 25° C. which comprise, by weight, about 25–40% tetrachloro-m-phenylene diisocyanate, about 25–40% trichloro-m-phenylene diisocyanate and about 20–50% aromatic polyisocyanate other than tetrachloro-m-phenylene diisocyanate and trichloro-m-phenylene diisocyanate. It is quite surprising that aromatic polyisocyanate blends containing 25–42% chlorine which are liquid at room temperature can be prepared from trichloro-m-phenylene diisocyanate and tetrachloro-m-phenylene diisocyanate, in view of the fact that these diisocyanates melt at 66° C. and 76° C., respectively.

The liquid chlorinated aromatic polyisocyanate blends of this invention are composed of about 50–80% trichoro-m-phenylene diisocyanate and tetrachloro-m-phenylene diisocyanate, and the remaining portion may be one or more aromatic polyisocyanate other than trichloro-m-phenylene diisocyanate and tetrachloro-m-phenylene diisocyanate. Aromatic polyisocyanates which are suitable as the third component include diisocyanates, such as m-phenylene diisocyanate, monochloro-m-phenylene diisocyanate, dichloro-m-phenylene diisocyanate, o-phenylene diisocyanate, p-phenylene diisocyanate, 2,4-tolylene diisocyanate, 2,6-tolylene diisocyanate, chlorinated tolylene diisocyanates, 3,3'-bitolylene-4,4'-diisocyanate, methylene-p-diphenyl diisocyanate, methylene-4,4'-bis(2-methylphenyl) diisocyanate, 1,5-naphthalene diisocyanate, 3,3'-dimethyl-4,4'-biphenylene diisocyanate, 3,3' - dimethoxy - 4,4' - biphenylene diisocyanate and 2,2',5,5'-tetramethyl-4,4'-biphenylene diisocyanate, and higher aromatic polyisocyanates such as methylidynetriphenyl triisocyanate and tolylene 2,4,6-triisocyanate, as well as other aromatic polyisocyanates. Preferably, the third component is one or more phenylene diisocyanates selected from the group consisting of dichloro-m-phenylene diisocyanate, monochloro-m-phenylene diisocyanate and m-phenylene diisocyanate.

Chlorinated m-phenylene diisocyanates are readily prepared by known methods, such as chlorinating m-phenylene diisocyanate with or without a catalyst at elevated temperatures. The chlorination reaction proceeds stepwise, and thus can be terminated so as to form a product containing predominantly any desired degree of chlorine, that is, monochloro-, dichloro-, trichloro-, or tetrachloro-m-phenylene diisocyanate. Suitable processes for chlorinating m-phenylene diisocyanate are fully disclosed by J. J. Tazuma in U.S. Patent Nos. 2,915,545 and 2,945,875.

The chlorinated aromatic polyisocyanate blends taught herein generally do not have sharp freezing points, but rather their freezing characteristics are defined by a range. The freezing ranges reported herein were determined by cooling the liquid blend with agitation, and observing the temperature at which crystals first appear and the set point, that is, the temperature at which voids can be created by stirring the liquid-crystal slurry. Alternatively, in the more complex blends containing 4 or more components in which serious supercooling occurred, the upper limit of the freezing range was determined by heating the blend from its set point and observing the temperature at which the last crystal melted.

All of the chlorinated aromatic polyisocyanate blends taught herein are capable of existing as liquids at about 25° C. Those blends which are normally slurries at 25° C. can exist as supercooled liquids at about 25° C. for periods of at least about 1–2 days, and generally longer, depending upon the specific blend and temperature. Supercooled liquids are readily formed by heating the blend to a temperature in excess of its freezing range and allowing it to cool slowly to the desired temperature without agitation.

The preferred blends of this invention are those having chlorine contents of about 29–42% and containing, by weight, about 25–40% tetrachloro-m-phenylene diisocyanate, about 25–40% trichloro-m-phenylene diisocyanate, about 15–40% dichloro-m-phenylene diisocyanate and about 0–31% phenylene diisocyanate selected from the group consisting of monochloro-m-phenylene diisocyanate and m-phenylene diisocyanate. These blends have relatively high chlorine contents and all of the components are derived from the same diisocyanate. They also have a more pleasing odor than blends containing tolylene diisocyanate.

Particularly preferred blends are those having chlorine contents of about 29–37% and containing, by weight, about 25–35% tetrachloro-m-phenylene diisocyanate, about 25–35% trichloro-m-phenylene diisocyanate, about 15–30% dichloro-m-phenylene diisocyanate, about 0–6% monochloro-m-phenylene diisocyanate, and about 10–25% m-phenylene diisocyanate. These blends have relatively high chlorine contents, are almost completely liquid at about 25° C. and form quasi-prepolymers which are liquid at about 25° C. The amount of monochloro-m-phenylene diisocyanate is purposely kept low since it is the most uneconomical of the chlorinated-m-phenylene diisocyanates.

Another group of blends which are particularly preferred are those having chlorine contents of about 38–42% and containing, by weight, about 30–40% tetrachloro-m-phenylene diisocyanate, about 30–40% trichloro-m-phenylene diisocyanate and about 25–40% dichloro-m-phenylene diisocyanate. These blends have high chlorine contents, can exist as supercooled liquids at about 25° C. and form quasi-prepolymers which are liquid at about 25° C.

All of the chlorinated aromatic polyisocyanate blends taught herein react with conventional high molecular weight polyols to form polyurethane quasi-prepolymers which are liquid at temperatures of about 25° C. These liquid quasi-prepolymers are prepared by condensing about 1 hydroxyl equivalent weight of polyol having an average molecular weight of about 200–5,000, an average of at least about 3 hydroxyl groups per molecule, and a hydroxyl number of at least about 100, with about 4–10 isocyanate equivalent weights of the chlorinated aromatic polyisocyanate blend.

The high molecular weight polyol which is used to prepare the liquid quasi-prepolymers of this invention may be any of the polyether polyols or polyester polyols which are conventionally used in the preparation of polyurethanes. Suitable polyether polyols are derived from the reaction of an alkylene oxide containing 2–4 carbon atoms with a polyhydroxyalkane containing 3–6 hydroxyl groups or a carbohydrate containing 5–8 hydroxyl groups. Illustrative examples of suitable polyhydroxyalkanes include glycerol, trimethylolethane, trimethylolpropane, 1,2,6-hexanetriol, pentaerythritol and sorbitol, while suitable carbohydrates include sucrose and dextrose, as well as other polyhydroxyalkanes and carbohydrates. Examples of suitable alkylene oxides include ethylene oxide, propylene oxide, epichlorohydrin and butene oxide. Based upon cost, availability and hydrolytic stability of the final product, propylene oxide is preferred. At least about 1 epoxy equivalent weight of alkylene oxide is generally reacted with each hydroxyl equivalent weight of polyol. These polyether polyols are described by Price in U.S. Patent No. 2,866,774.

Polyester polyols which are suitable for preparing the quasi-prepolymers of this invention are derived from the reaction of more than 1, but not more than 2, hydroxyl equivalent weights of a polyol containing 2–4 hydroxyl groups with each equivalent weight of a dicarboxylic acid. Illustrative examples of suitable dicarboxylic acids include succinic, adipic, phthalic, isophthalic, sebacic and chlorendic acids, as well as many others. Examples of suitable polyols include ethylene glycol, diethylene glycol, polyethylene glycol, propylene glycol, dipropylene glycol, polypropylene glycol, glycerol, trimethylolethane, trimethlolpropane, 1,2,6-hexanetriol and pentaerythritol, as well as other polyols. The polyol component may be a single polyol or it may be a mixture of 2 or more polyols containing 2–4 hydroxyl groups. Since the polyester polyol should contain at least about 3 hydroxyl groups per molecule, the polyol component should contain at least some polyol containing 3–4 hydroxyl groups.

A particularly preferred class of polyols for preparing the liquid quasi-prepolymers of this invention includes those containing at least about 2% phosphorus and having an average molecular weight of about 300–2,000, an average of at least about 3 hydroxyl groups per molecule, and a hydroxyl number of at least about 300. These polyols may be any phosphorus-containing polyol such as a phosphorylated polyether polyol, a phosphorylated polyester polyol or a phosphate polyol derived from phosphoric acid. The quasi-prepolymers derived from these polyols preferably contain 5–8 isocyanate equivalent weights for each hydroxyl equivalent weight.

The phosphorylated polyols which are suitable for preparing the preferred liquid quasi-prepolymers of this invention are the condensation products of a polyether polyol or polyester polyol containing at least about 4 hydroxyl groups per molecule and a diorgano phosphorochloridate having the formula $(X_nRO)_2P(O)Cl$ in which X is selected from the group consisting of chlorine and bromine, $n$ is 0–4 and R is an organic radical selected from the group consisting of alkyl radicals containing 1–5 carbon atoms, phenyl, and tolyl. Illustrative examples of the $X_nR$ group include alkyls, such as methyl, ethyl, β-chloroethyl, β-bromoethyl, β,β-dichloroethyl, β,β,β-trichloroethyl, propyl, isopropyl, β-chloropropyl, β-bromopropyl, β,γ-dichloropropyl, β,γ-dibromopropyl, β-bromo-γ-chloropropyl, β,β,γ,γ-tetrachloropropyl, butyl, isobutyl, sec.-butyl, β-chlorobutyl, β-bromobutyl and amyl, and aromatics, such as phenyl, chlorophenyl, bromophenyl, dichlorophenyl, trichlorophenyl, o-tolyl, m-tolyl, p-tolyl, chlorotolyls, bromotolyls and dichlorotolyls, as well as many others.

The phosphorylation of the high molecular weight polyol is carried out by reacting the phosphorochloridate with the polyl in the presence of an acid acceptor such as triethylamine. The reaction of a hydroxyl group with the phosphorochloridate is illustrated by the following equation:

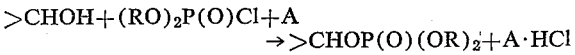

in which A stands for the acid acceptor.

Since the reaction goes to completion, the degree of phosphorylation is readily controlled by the amount of phosphorochloridate present. The phosphorochloridate should be present in an amount sufficient to provide at least about 2% phosphorus in the phosphorylated polyol. In most cases, an equimolar amount of phosphorochloridate will provide more than this minimum phosphorus requirement. When the high molecular weight polyol contains an average of more than about 4 hydroxyl groups per molecule, more than 1 mole of phosphorochloridate may be employed per mole of high molecular weight polyol, if desired. These phosphorylated polyether and polyester polyols are more fully disclosed in a copending patent application of M. R. Lutz, G. Nowlin and H. Strange, Serial No. 137,521, filed September 12, 1961.

Other phosphorus-containing polyols such as the phosphate polyols derived from phosphoric acid are also suitable for preparing the preferred liquid quasi-prepolymers of this invention. These polyols are prepared by condensing phosphoric acid with at least about 3 moles of propylene oxide thereby forming a tris(hydroxypropyl) phosphate having the formula

in which $n$ is about 1–3. These phosphates are fully described by C. E. Adams and B. H. Shoemaker in U.S. Patent No. 2,372,244.

The liquid quasi-prepolymers of this invention are prepared by mixing the chlorinated aromatic polyisocyanate blend with the high molecular weight polyol at elevated temperature. Generally the mixture is heated to at least about 35° C. so that the polyol will dissolve in the diisocyanate blend before the reaction takes place, thereby avoiding the formation of polyurethane gel. This mixing may also be aided by the addition of a fluorocarbon, or the use of a homogenizer. It is generally desirable to add the polyol slowly with agitation in order to prevent the generation of a large exotherm. Temperatures above about 85° C. should be avoided since they tend to impair the stability of the quasi-prepolymer.

The novel flame-retardant polyurethane compositions derived from the chlorinated aromatic polyisocyanate blends and the quasi-prepolymers disclosed herein are prepared by condensing about 1 hydroxyl equivalent weight of polyol containing at least about 2% phosphorus, having an average molecular weight of 200–5,000, an average of at least 3 hydroxyl groups per molecule, and an average hydroxyl number of at least about 100 with at least about 1 isocyanate equivalent weight of the chlorinated aromatic polyisocyanate blend. When the polyurethane composition is derived from a liquid quasi-prepolymer, part of this high molecular weight polyol will, of course, be contained in the quasi-prepolymer. The quasi-prepolymer method is generally preferred for rigid foams in order to avoid the extremely fast reaction and excessive exotherms which are frequently encountered in the "one-shot" method.

The preferred polyurethane compositions of this invention are prepared from polyols containing at least about 2% phosphorus, having an average molecular weight of about 300–2,000, an average of at least about 3 hydroxyl groups per molecule, and an average hydroxyl number of at least about 300. These compositions preferably contain about 1–1.2 isocyanate equivalent weight of chlorinated phenylene diisocyanate blend for each hydroxyl equivalent weight of polyol.

The polyurethane compositions taught herein may be prepared using 1 or more high molecular weight polyols. For example, the polyol component may be a mixture of 1 or more polyether polyols or polyester polyols with 1 or more phosphorus-containing polyols, or the polyol component may be a mixture of 2 or more phosphorus-containing polyols. When a mixture of polyols is employed, it is convenient to make a quasi-prepolymer from the polyol which is present in minor amount, and then react this quasi-prepolymer with the major polyol. In the case of flexible foams and elastomers, polyether polyols containing only 2 hydroxyl groups per molecule such as polypropylene glycol may be used in combination with other polyols containing 4 or more hydroxyl groups.

The polyurethane compositions taught herein have useful applications as flame-retardant foams, surface coatings, castings and moldings. They are especially useful as rigid foams which can be used as flame-proof insulation materials for the building industry.

Polyurethane foams are readily prepared by mixing together the high molecular weight polyol, the chlorinated aromatic polyisocyanate blend and a blowing agent, such as a fluorocarbon or water. As the reaction between the polyol and the polyisocyanate begins, the exothermic heat of reaction vaporizes the fluorocarbon with a resulting expansion of the reaction medium into a foam. When water is used as the blowing agent, it reacts with excess polyisocyanate liberating carbon dioxide which expands the reaction medium. Small amounts of additional components such as catalysts and emulsifiers may be added, if desired, to alter the handling characteristics of the reaction mixture or the properties of the foam.

The following examples, illustrating the novel liquid polyisocyanate blends disclosed herein, novel liquid quasi-prepolymers derived therefrom, and their use in the preparation of novel polyurethane compositions, are presented without any intention that the invention be limited thereto. All parts and percentages are by weight.

In these examples, the flame-retardance of the polyurethane foams are measured by ASTM test method D1692–59T. Samples of the foam measuring 2 x 6 x ½ inch were marked with two lines which were one inch and five inches from one end of each sample. A wing-tipped Bunsen burner flame was applied to one end of the sample for a period of one minute. If the flame did not reach the one-inch line, the sample was considered to be nonburning.

EXAMPLES 1–21

Liquid chlorinated aromatic polyisocyanate blends were prepared by mixing varying amounts of tetrachloro-m-phenylene diisocyanate, trichloro-m-phenylene diisocyanate, dichloro-m-phenylene diisocyanate, monochloro-m-phenylene diisocyanate, m-phenylene diisocyanate and tolylene diisocyanate (80/20 blend of 2,4- and 2,6-tolylene diisocyanate). The freezing ranges of these blends were determined by heating the blends until all solids were melted, and then allowing them to cool while vigorously stirring. The freezing range was reported as the temperature between the first crystal formation and the point at which voids could be created by stirring. When serious supercooling occurred, the upper limit was determined by heating the blend from its set point and reporting the temperature at which the last crystal melted. The compositions of the blends were checked by vapor phase chromatography. The specific blends prepared are set forth in the following table:

*Chlorinated aromatic polyisocyanate blends*

| Ex. | $Cl_n$-m-PDI [1] | | | | | TDI [2] | Freezing range, °C | Percent Cl |
|---|---|---|---|---|---|---|---|---|
| | n=4 | n=3 | n=2 | n=1 | n=0 | | | |
| 1 | 30 | 30 | | | | 40 | −9 to 7 | 26 |
| 2 | 33 | 33 | | | | 33 | 7 to 13 | 29 |
| 3 | 25 | 25 | 25 | | | 25 | 0 to 19 | 30 |
| 4 | 25 | 25 | 25 | | 25 | | 9 to 19 | 30 |
| 5 | 27 | 27 | 22 | 4 | | 20 | 3 to 20 | 31 |
| 6 | 27 | 27 | 26 | | 20 | | 6 to 24 | 31 |
| 7 | 31 | 31 | 28 | | | 10 | 14 to 24 | 35 |
| 8 | 31 | 31 | 24 | 4 | | 10 | 13 to 25 | 35 |
| 9 | 25 | 25 | 25 | 23 | 2 | | 11 to 26 | 34 |
| 10 | 27 | 27 | 27 | 5 | 14 | | 12 to 26 | 33 |
| 11 | 34 | 33 | 17 | 4 | 12 | | 11 to 27 | 35 |
| 12 | 30 | 30 | 30 | | 10 | | 17 to 27 | 35 |
| 13 | 33 | 33 | 29 | | | 5 | 19 to 27 | 37 |
| 14 | 33 | 33 | 25 | 4 | | 5 | 16 to 28 | 37 |
| 15 | 33 | 40 | 27 | | | | 21 to 28 | 40 |
| 16 | 35 | 34 | 18 | 1 | 12 | | 13 to 29 | 37 |
| 17 | 34 | 34 | 27 | 5 | | | 20 to 30 | 39 |
| 18 | 37 | 37 | | | 26 | | 19 to 31 | 32 |
| 19 | 30 | 40 | 30 | | | | 23 to 30 | 40 |
| 20 | 33 | 33 | | | 33 | | 23 to 31 | 29 |
| 21 | 33 | 33 | 33 | | | | 25 to 32 | 39 |

[1] Chlorinated-m-phenylene diisocyanate.
[2] Tolylene diisocyanate.

The following examples illustrate the preparation of polyurethane compositions by the "one-shot" method using the chlorinated aromatic polyisocyanate blends of the previous examples.

EXAMPLE 22

A polyurethane foam was prepared as follows: One hundred parts of a phosphorylated polyether polyol having a hydroxyl number of 315 and containing 5.8% phosphorus and 12% chlorine (prepared by reacting bis($\beta$-chloroethyl) phosphorochloridate with a commercial polyether polyol having a hydroxyl number of 600, and derived from the condensation of propylene oxide with sorbitol), 30 parts of trichlorofluoromethane, 0.25 part of dibutyltin di-2-ethylhexoate, 0.25 part of N-methylmorpholine and 1 part of an organosilicone copolymer emulsifier, sold by Union Carbide Corp. as L-520, were blended together by stirring. To this mixture was added 98 parts of the chlorinated aromatic diisocyanate blend of Example 1 containing 26% chlorine. The mixture was stirred at a high rate after which foaming took place. The resulting foam was rigid, had a density of 2.0 lb./cu. ft. and was nonburning.

EXAMPLE 23

A polyurethane foam was prepared as follows: Sixteen parts of a phosphorylated polyether polyol having a hydroxyl number of 243 and containing 5.1% phosphorus and 11.6% chlorine (prepared by reacting bis($\beta$-chloroethyl) phosphorochloridate with a commercial polyether polyol having a hydroxyl number of 530, and derived from the condensation of propylene oxide with pentaerythritol), 37 parts of a commercial polypropylene glycol having a hydroxyl number of 56, 0.1 part of dibutyltin dilaurate, 0.4 part of an organo-silicone copolymer emulsifier and 2.1 parts of water. To this mixture was added 45 parts of the chlorinated aromatic diisocyanate blend of Example 2 containing 29% chlorine. The mixture was stirred at a high rate after which foaming took place. The resulting foam was flexible, had a density of 3.5 lb./cu. ft. and was nonburning.

EXAMPLE 24

A polyurethane foam was prepared as follows: One hundred parts of a phosphorylated polyester polyol having a hydroxyl number of 351 and containing 4.1% phosphorus and 9.4% chlorine (prepared by reacting bis($\beta$-chlorethyl) phosphorochloridate with a polyester having a hydroxyl number of 544, and derived from sebacic acid and trimethylol propane), 30 parts of trichlorofluoromethane, 0.75 parts of stannous octoate, 0.5 part of 1,4-bis(2-hydroxypropyl)-2-methylpiperazine and 1.0 part of an organo-silicone copolymer emulsifier were blended together by stirring. Ninety-eight parts of the chlorinated phenylene diisocyanate blend of Example 21 containing 39% chlorine was completely liquified by heating to 35° C., allowed to cool to 25° C., at which temperature it remained a supercooled liquid, and then added to the reaction mixture. The mixture was stirred at a high rate after which foaming took place. The resulting foam was rigid, had a density of 2.0 lbs./cu. ft. and was nonburning.

EXAMPLE 25

A polyurethane coating was prepared as follows: Twenty parts of a phosphorylated polyether polyol having a hydroxyl number of 373 and containing 3.4% phosphorus and 7.9% chlorine (prepared by reacting bis($\beta$-chlorethyl) phosphorochloridate with a commercial polyether polyol having a hydroxyl number of 600, and derived from the condensation of propylene oxide with sorbitol) dissolved in 20 parts of acetone was blended with a mixture containing 21 parts of the chlorinated m-phenylene diisocyanate blend of Example 21 containing 39% chlorine, 19 parts of benzene and 0.05 parts of stannous octoate. A 5-mil coating of the blend was applied to a tinned steel panel using a doctor blade. The coating was air dried for 15 min. and then cured in an oven at 125° C. for 15 min. The resulting coating had a colorless, clear, hard finish.

The following examples illustrate the preparation of liquid quasi-prepolymers and polyurethane compositions derived therefrom using the chlorinated aromatic polyisocyanate blends of the previous examples.

EXAMPLE 26

A liquid polyurethane quasi-prepolymer was prepared as follows: Eighty-one parts of the chlorinated m-phenylene diisocyanate blend of Example 10 containing 33% chlorine was heated to approximately 60° C. and placed in a 3-necked reaction flask. Provisions were made for agitation with a mechanical stirrer, and the flask was fitted to blanket the reactants with dry nitrogen gas. Twenty parts of a phosphorylated polyether polyol having a hydroxyl number of 315 and containing 5.4% phosphorus and 11.3% chlorine (prepared by reacting bis($\beta$-chloroethyl) phosphorochloridate with a commercial polyether polyol having a hydroxyl number of 650, and derived from the condensation of propylene oxide with sorbitol) was added dropwise to the flask while agitating the reaction medium. After the addition was completed, the medium was agitated for an additional ½ hr. at 50–60° C., the reaction product was removed from the flask, stored in a closed container and allowed to cool. The quasi-prepolymer had a viscosity of 23,000 cps. at 25° C.

A polyurethane foam was prepared from the quasi-prepolymer as follows: Forty-three parts of the quasi-prepolymer was blended with 40 parts of the same phosphorylated polyether polyol as was used in the preparation of the quasi-prepolymer, 15 parts of trichlorofluoromethane blowing agent, 1.1 parts of an organo-silicone copolymer emulsifier and 1.1 parts of dibutyltin dilaurate catalyst were combined by the action of a high speed mixer for 15 sec., after which foaming took place. The resulting foam was rigid, had a density of 2.3 lbs./cu. ft. and was nonburning.

EXAMPLE 27

A liquid polyurethane quasi-prepolymer was prepared as follows: Eighty-one parts of the chlorinated m-phenylene diisocyanate blend of Example 16 containing 36% chlorine was heated to approximately 60° C. and placed in a 3-necked reaction flask fitted with a mechanical stirrer and in inlet for blanketing the reactants with dry nitrogen gas. Nineteen parts of a phosphorylated polyether polyol having a hydroxyl number of 315 and containing 5.4% phosphorus and 11.3% chlorine (prepared by reacting bis($\beta$-chloroethyl) phosphorochloridate with a commercial polyether polyol having a hydroxyl number of 650, and derived from the condensation of propylene oxide with sorbitol) was added dropwise to the flask while agitating the reaction medium. After the addition was completed, the medium was agitated for an additional ½ hr. at 50–60° C., the reaction product was removed from the flask, stored in a closed container and allowed to cool. The quasi-prepolymer had a viscosity of 14,400 cps. at 25° C.

A polyurethane foam was prepared from the quasi-prepolymer as follows: Forty-four parts of the quasi-prepolymer was blended with 39 parts of the same phosphorylated polyether polyol as was used to prepare the quasi-prepolymer, 15 parts of trichlorofluoromethane blowing agent, 1.1 parts of an organo-silicone copolymer emulsifier and 1.1 parts of dibutyltin dilaurate catalyst were combined by the action of a high speed mixer for 15 sec. after which foaming took place. The resulting foam was rigid, had a density of 2.2 lbs./cu. ft. and was nonburning.

EXAMPLE 28

A liquid polyurethane quasi-prepolymer was prepared as follows: Eighty-eight parts of the chlorinated m-phenylene diisocyanate blend of Example 18 containing 32% chlorine was heated to approximately 60° C. and placed in a 3-necked reaction flask fitted with a mechanical stirrer and an inlet for blanketing the reaction with dry nitrogen gas. Twelve parts of a commercial polyether polyol having a hydroxyl number of 560 and derived from the condensation of propylene oxide with pentaerythritol was added dropwise to the flask while agitating the reaction medium. After the addition was completed, the medium was agitated for an additional ½ hr. at 50–60° C., the reaction product was removed from the flask, stored in a closed container and allowed to cool. The quasi-prepolymer had a viscosity of 4,000 cps. at 25° C.

A polyurethane foam was prepared from the quasi-prepolymer as follows: Forty-two parts of the quasi-prepolymer was blended with 41 parts of a phosphorylated polyether polyol having a hydroxyl number of 315 and containing 5.4% phosphorus and 11.3% chlorine (prepared by reacting bis(β-chloroethyl) phosphorochloridate with a commercial polyether polyol having a hydroxyl number of 650, and derived from the condensation of propylene oxide with sorbitol), 15 parts of trichlorofluoromethane blowing agent, 1.0 part of an organo-silicone copolymer emulsifier, 1.0 part of dibutyltin dilaurate catalyst and 0.6 part of N-methylmorpholine catalyst were combined by the action of a high speed mixer for 7 sec. after which foaming took place. The resulting foam was rigid, had a density of 2.0 lbs./cu. ft. and was nonburning.

EXAMPLE 29

A liquid polyurethane quasi-prepolymer was prepared as follows: Eighty-one parts of the chlorinated m-phenylene diisocyanate blend of Example 18 containing 32% chlorine was heated to approximately 60° C. and placed in a 3-necked reaction flask fitted with a mechanical stirrer and an inlet for blanketing the reactants with dry nitrogen gas. Nineteen parts of a phosphorylated polyether polyol having a hydroxyl number of 315 and containing 5.4% phosphorus and 11.3% chlorine (prepared by reacting bis(β-chloroethyl) phosphorochloridate with a commercial polyether polyol having a hydroxyl number of 650, and derived from the condensation of propylene oxide with sorbitol) was added dropwise to the flask while agitating the reaction medium. After the addition was completed, the medium was agitated for an additional ½ hr. at 50–60° C., the quasi-prepolymer was removed from the flask, stored in a closed container and allowed to cool. The quasi-prepolymer had a viscosity of 150,00 cps. at 25° C.

A polyurethane foam was prepared from the quasi-prepolymer as follows: Forty-four parts of the quasi-prepolymer was blended with 39 parts of the same phosphorylated polyester polyol as was used to prepare the quasi-prepolymer, 15 parts of trichlorofluoromethane blowing agent, 1.1 parts of an organo-silicone copolymer emulsifier and 1.1 parts of dibutyltin dilaurate catalyst were combined by the action of a high speed mixer for 18 sec. after which foaming took place. The resulting foam was rigid, had a density of 2.3 lbs./cu. ft. and was nonburning.

EXAMPLE 30

A liquid polyurethane quasi-prepolymer was prepared as follows: Eighty-two parts of the chlorinated m-phenylene diisocyanate blend of Example 21 containing 39% chlorine was heated to approximately 60° C. and placed in a 3-necked reaction flask fitted with a mechanical stirrer and an inlet for blanketing the reactants with dry nitrogen gas. Eighteen parts of a phosphorylated polyester polyol having a hydroxyl number of 200 and containing 6.7% phosphorus and 16% chlorine (prepared by reacting 100 parts of succinic acid, 202 parts of sebacic acid and 485 parts of trimethylolpropane to a hydroxyl number of 544) was added dropwise to the flask while agitation the reaction medium. After the addition was completed, the medium was agitated for an additional ½ hr. at 50–60° C., the liquid reaction product was removed from the flask, stored in a closed container and allowed to cool. The quasi-prepolymer had a viscosity of 11,000 cps. at 270 C.

A polyurethane foam was prepared from the quasi-prepolymer as follows: Forty-six parts of the quasi-prepolymer was blended with 19 parts of the same phosphorylated polyester polyol as was used in the preparation of the quasi-prepolymer and 15 parts of a commercial polyether polyol having a hydroxyl number of 640 and derived from the condensation of propylene oxide with sorbitol, 16 parts of trichlorofluoromethane blowing agent, 1.4 parts of an organo-silicone copolymer emulsifier, 1.4 part of dibutyltin dilaurate catalyst and 0.5 part of N-methylmorpholine catalyst were combined by the action of a high speed mixer for 8 sec., after which foaming took place. The resulting foam was rigid, had a density of 3.0 lbs./cu. ft. and was nonburning.

EXAMPLE 31

A liquid polyurethane quasi-prepolymer was prepared as follows: Eighty parts of the chlorinated m-phenylene diisocyanate blend of Example 21 containing 39% chlorine was heated to approximately 60° C. and placed in a 3-necked reaction flask fitted with a mechanical stirrer and an inlet for blanketing the reactants with dry nitrogen gas. Twenty-one parts of a tris(hydroxypropyl) phosphate having a hydroxyl number of 370 and a phosphorus content of 7.3%, and prepared by condensing propylene oxide with phosphoric acid, was added dropwise to the flask while agitating the reaction medium. After the addition was completed, the medium was agitated for an additional ½ hr. at 50–60° C., the reaction product was removed from the flask, stored in a closed container and allowed to cool. The quasi-prepolymer had a viscosity of 6,000 cps. at 25° C.

A polyurethane foam was prepared from the quasi-prepolymer as follows: Forty-five parts of the quasi-prepolymer was blended with 35 parts of a phosphorylated polyether polyol having a hydroxyl number of 315 and containing 5.4% phosphorus and 11.3% chlorine (prepared by reacting bis(β-chloroethyl)phosphorochloridate with a commercial polyether polyol having a hydroxyl number of 650, and derived from the condensation of propylene oxide with sorbitol), 18 parts of trichlorofluoromethane blowing agent, 1.1 parts of an organo-silicone copolymer emulsifier and 1.1 parts of dibutyltin dilaurate catalyst were combined by the action of a high speed mixer for 17 sec. after which foaming took place. The resulting foam was rigid, had a density of 2.0 lbs./cu. ft. and was nonburning.

EXAMPLE 32

A liquid polyurethane quasi-prepolymer was prepared as follows: Ninety parts of the chlorinated diisocyanate blend of Example 21 containing 39% chlorine was heated to approximately 60° C. and placed in a 3-necked reaction flask fitted with a mechanical stirrer and an inlet for blanketing the reactants with dry nitrogen gas. Three parts of a commercial polyether polyol having a hydroxyl number of 648, and derived from the condensation of propylene oxide with sorbitol, was added slowly to the flask while the reaction mixture was agitated. An exothermic reaction took place between the diisocyanate and polyol, and the temperature rose to about 70° C. After the exotherm had subsided, the reactants were cooled to 60° C. and another 3-part increment of polyether polyol was added. This procedure was repeated until 10 parts of polyether polyol had been added, after which the medium was agitated for an additional ½ hr. at 50–60° C. The reaction product was removed from the flask, stored in a closed container and allowed to cool. The quasi-prepolymer had a viscosity of 9,300 cps. at 25° C.

A polyurethane foam was prepared from the quasi-prepolymer as follows: One hundred parts of the quasi-prepolymer was blended with 88 parts of a phosphorylated polyether polyol having a hydroxyl number of 330 and a phosphorus content of 5.1% and a chlorine content of 12.2 (derived from the reaction of bis(β-chloroethyl) phosphorochloridate with a commercial polyether polyol having a hydroxyl number of 640, and derived from the condensation of propylene oxide with sorbitol), 33 parts of trichlorofluoromethane blowing agent and 0.66 part of an organo-silicone copolymer emulsifier were combined by the action of a high speed mixer for 15 sec. after which foaming took place. The resulting foam was rigid, had a density of 2.1 lbs./cu. ft. and was nonburning.

As will be apparent to those skilled in the art, numerous modifications and variations of the chlorinated aromatic polyisocyanate blends, liquid quasi-prepolymers and flame-retardant polyurethane compositions disclosed herein may be made without departing from the spirit of the invention or the scope of the following claims.

We claim:
1. A blend of aromatic polyisocyanates which comprises, by weight, 25–40% tetrachloro-m-phenylene diisocyanate, 25–40% trichloro-m-phenylene diisocyanate and 20–25% aromatic polyisocyanate other than tetrachloro-m-phenylene diisocyanate and trichloro-m-phenylene diisocyanate, the sum of said components being 100% of the blend, said blend containing 25–42% chlorine, by weight, and being capable of existing as a liquid at 25° C.

2. A blend of phenylene diisocyanates which comprises, by weight, 25–40% tetrachloro-m-phenylene diisocyanate, 25–40% trichloro-m-phenylene diisocyanate and 20–50% phenylene diisocyanate selected from the group consisting of dichloro-m-phenylene diisocyanate, monochloro-m-phenylene diisocyanate and m-phenylene diisocyanate, the sum of said components being 100% of the blend, said blend containing 25–42% chlorine, by weight, and being capable of existing as a liquid at 25° C.

3. A blend of phenylene diisocyanates containing at least 4 components which comprises, by weight, 25–40% tetrachloro-m-phenylene diisocyanate, 25–40% trichloro-m-phenylene diisocyanate, 15–40% dichloro-m-phenylene diisocyanate and not more than 31% phenylene diisocyanate selected from the group consisting of monochloro-m-phenylene diisocyanate and m-phenylene diisocyanate, the sum of said components being 100% of the blend, said blend containing 29–42% chlorine, by weight, and being capable of existing as a liquid at 25° C.

4. A blend of phenylene diisocyanates which comprises, by weight, 25–35% tetrachloro-m-phenylene diisocyanate, 25–35% trichloro-m-phenylene diisocyanate, 15–30% dichloro-m-phenylene diisocyanate, 0–6% monochloro-m-phenylene diisocyanate and 10–25% m-phenylene diisocyanate, the sum of said components being 100% of the blend, said blend containing 29–37% chlorine, by weight, and being capable of existing as a liquid at 25° C.

5. A blend of phenylene diisocyanates which comprises, by weight, 30–40% tetrachloro-m-phenylene diisocyanate, 30–40% trichloro-m-phenylene diisocyanate, and 25–40% dichloro-m-phenylene diisocyanate, the sum of said components being 100% of the blend, said blend containing 38–42% chlorine, by weight, and being capable of existing as a liquid at 25° C.

References Cited by the Examiner

UNITED STATES PATENTS

| | | | |
|---|---|---|---|
| 2,866,774 | 12/1958 | Price | 260—77.5 |
| 2,915,545 | 12/1959 | Tazuma | 260—453 |
| 2,945,875 | 7/1960 | Tazuma | 260—453 |
| 3,081,331 | 3/1963 | Fried | 260—77.5 |

OTHER REFERENCES

Eastman and Rollefson (first ed.), copyright 1947, p. 321, par. 7.

LEON J. BERCOVITZ, *Primary Examiner.*

M. C. JACOBS, *Assistant Examiner.*